US011605094B2

(12) United States Patent
Trujillo et al.

(10) Patent No.: US 11,605,094 B2
(45) Date of Patent: Mar. 14, 2023

(54) SYSTEM FOR THIRD PARTY SELLERS IN ONLINE RETAIL ENVIRONMENT (71) Applicant: Target Brands, Inc., Minneapolis, MN (US)

(72) Inventors: Jorge A. Trujillo, Minneapolis, MN (US); Andrew Boerema, Minneapolis, MN (US); Dakota Reese Brown, Saint Paul, MN (US)

(73) Assignee: Target Brands, Inc., Minneapolis, MN (US)

( * ) Notice: Subject to any disclaimer, the term of this patent is extended or adjusted under 35 U.S.C. 154(b) by 407 days.

(21) Appl. No.: 16/785,105

(22) Filed: Feb. 7, 2020

(65) Prior Publication Data
US 2020/0334688 A1 Oct. 22, 2020

Related U.S. Application Data (60) Provisional application No. 62/837,063, filed on Apr. 22, 2019.

(51) Int. Cl.
*G06Q 20/00* (2012.01)
*G06Q 30/018* (2023.01)
(Continued)

(52) U.S. Cl.
CPC .......... *G06Q 30/0185* (2013.01); *G06F 9/54* (2013.01); *G06F 16/2365* (2019.01);
(Continued)

(58) Field of Classification Search
CPC ............ G06Q 30/0185; G06Q 30/018; G06Q 30/0607; G06Q 30/0613; G06F 9/54;
(Continued)

(56) References Cited

U.S. PATENT DOCUMENTS 6,400,845 B1 6/2002 Volino
6,822,761 B2 11/2004 Sakaki et al.
(Continued)

OTHER PUBLICATIONS

Vision A1—Derive Image Insights via ML—Cloud Vision API—Google Cloud—Get started (https://cloud.google.com/vision/overview/docs/get-started/); Dated Sep. 20, 2019; 18 Pages.
(Continued)

*Primary Examiner* — Dante Ravetti
(74) *Attorney, Agent, or Firm* — Merchant & Gould P.C.

(57) ABSTRACT

A third party item listing management system useable for validation of third party items to be included on a retailer website is disclosed. The third party item listing management system includes an application programming interface (API) accessible by a plurality of third parties and configured to receive item data. An item management process receives the item data and calls an item validation pipeline which includes a plurality of item validation stages including an item legalization stage. In the item legalization stage, the item data and the identity of the third party are validated against a plurality of item listing rules to determine whether the one or more items are allowed to be offered via the retailer website by the third party. The item listing rules can include a rule preventing the third party from listing an item included in a core item collection offered by the retailer via the retailer website.

17 Claims, 8 Drawing Sheets (51) Int. Cl.
*G06Q 30/0601* (2023.01)
*G06F 9/54* (2006.01)
*G06F 16/23* (2019.01)
*H04L 67/53* (2022.01)
*G06F 40/279* (2020.01)
*G06V 30/40* (2022.01)

(52) U.S. Cl.
CPC ....... *G06Q 30/018* (2013.01); *G06Q 30/0607* (2013.01); *G06Q 30/0613* (2013.01); *H04L 67/53* (2022.05); *G06F 40/279* (2020.01); *G06V 30/40* (2022.01)

(58) Field of Classification Search
CPC ... G06F 16/2365; G06F 40/279; H04L 67/53; G06V 30/40
USPC .......................... 705/16, 21, 59; 380/44, 262
See application file for complete search history.

(56) References Cited

U.S. PATENT DOCUMENTS

| | | |
|---|---|---|
| 7,472,077 B2 | 12/2008 | Roseman et al. |
| 7,497,369 B2 | 3/2009 | Dalzell et al. |
| 8,732,030 B2 | 5/2014 | Gokturk et al. |
| 9,741,034 B1 | 8/2017 | Criss |
| 2001/0047340 A1 | 11/2001 | Snow et al. |
| 2005/0171858 A1 | 8/2005 | Cotton et al. |
| 2014/0068047 A1* | 3/2014 | Williams ............ H04L 41/5077 709/223 |
| 2018/0341955 A1 | 11/2018 | Amarthalur et al. |
| 2022/0122122 A1* | 4/2022 | Kannadasan ...... G06Q 30/0248 |

OTHER PUBLICATIONS

Food Dehydrator—Walmart.com—https://www.walmart.com/search/?query=food dehydrator&typeahead=food de—Dated May 8, 2019—9 Pages.

* cited by examiner

SYSTEM FOR THIRD PARTY SELLERS IN ONLINE RETAIL ENVIRONMENT

PRIORITY CLAIM

This application claims priority to U.S. Provisional Application Ser. No. 62/837,063, filed on Apr. 22, 2019, the entire disclosure of which is hereby expressly incorporated herein by reference.

TECHNICAL FIELD

The present disclosure relates generally to methods and systems for management of third party sellers of items hosted on a retailer website. More particularly, the present disclosure describes a system architecture for managing sellers, items, item types, and/or item brands that the seller is authorized to sell via the retailer website.

BACKGROUND

Retail enterprises, and in particular online retail enterprises, are increasingly supporting sales from third party sellers, e.g., through the retailer's website. This presents a number of challenges to the retailer. For example, customers who may have complaints regarding a particular item or who wish to return that item may be required to return that item to different suppliers, despite the customer purchasing the item from the retailer website in a manner that may not be obvious to the user that his/her order is fulfilled by a seller other than the retailer. Furthermore, because a number of sellers may be supported, it is possible that different sellers may wish to sell the same or similar items, or items from the same brand, or of the same type.

For online retail portals that operate as hosted platforms for reselling (e.g., eBay, Amazon, etc.) presenting a customer with duplicate or similar items is less of a concern, since customers expect to be purchasing from third parties and can compare reviews of those third parties. However, in cases where an online retailer sells items from their own item collection alongside offerings from third parties, presentation of multiple similar items may cause customer confusion, and result in a degraded online experience.

Online retailers can also face challenges if a third party seller proposes to sell an item with incorrect, incomplete, or even offensive item information. If information provided by a third party is not verified, the incorrect or incomplete item information appears on the retail's website and can purport to be endorsed by the retailer, leading to a negative perception of the retailer by potential customers.

SUMMARY

Generally, the present disclosure relates to management of third party sellers of items hosted on a retailer website. In example aspects, an automatic item approval process determines, based on an identity of the seller, items, item types, and/or item brands that the seller is authorized to sell via the retailer website. In other example aspects, an automatic item approval process determines, based on a verification of the item details provided by the third party, the third party seller is authorized to sell the item via the retailer website.

In a first aspect, a third party item listing management system useable for validation of third party items to be included on a retailer website is disclosed. The third party item listing management system includes an application programming interface (API) accessible by a plurality of third parties, the API being configured to receive an identity of a third party and item data associated with one or more items, and an item management process configured to receive the item data and call an item validation pipeline, the item validation pipeline including a plurality of item validation stages including an item legalization stage. In the item legalization stage, the item data and the identity of the third party are validated against a plurality of item listing rules to determine whether the one or more items are allowed to be offered via the retailer website by the third party. The plurality of item listing rules includes a rule preventing the third party from listing an item included in a core item collection offered by the retailer via the retailer website.

In a second aspect, a method of automatically validating items sold by a third party for listing on a retail website is disclosed. The method includes receiving, at an application programming interface (API) of a retailer item management system, an identity of a third party and item data describing one or more items submitted by the third party for inclusion on a retailer website. The method further includes processing the item data at an item validation pipeline, wherein processing the item data includes validating the item data and the identity of the third party against a plurality of item listing rules to determine whether the one or more items are allowed to be offered via the retailer website by the third party, the plurality of item listing rules including a rule preventing the third party from listing an item included in a core item collection offered by the retailer via the retailer website.

In a third aspect, a method of submitting item data associated with items for listing on a retail website by a third party is disclosed. The method includes submitting, at an application programming interface (API) of a retailer item management system, an identity of a third party and item data describing one or more items fulfilled by the third party for inclusion on a retailer website, and receiving an item validation report indicating one or more issues identified in the item data by a plurality of item listing rules managed by the retailer, the issues including an error preventing the one or more items from being listed on the retailer website, the error indicating that the at least one item corresponds to an item offered by the retailer as part of a core item collection. The method further includes submitting revised item data at the API addressing at least the error by excluding the at least one item, thereby automatically listing items described in the revised item data at the retailer website.

In a fourth aspect, a third party item listing management system usable for verification of third party items to be included on a retailer website is described. The third party item listing management system includes an application programming interface and an item verification pipeline. The application programming interface is accessible by a plurality of third parties and is configured to receive item data associated with one or more items. The item verification pipeline is configured to receive the item data and call an item validation pipeline, the item validation pipeline includes a plurality of item validation stages including a field verification. At the field verification stage, data is extracted from at least one of an item image or text associated with the item. The data extracted is compared to item data obtained from an independent verification source to confirm the accuracy of the item data provided by the third party.

In a fifth aspect, a method of automatically verifying items sold by ⅓ party from listing on a retail website is described. The method includes receiving at an application programming interface of a retailer item management system in item data including at least one of an item image or item text depicting or describing one or more items admitted by the third party for inclusion on a retailer website. The item data is processed at an item validation pipeline. Processing the item data includes extracting data from at least one of the image or the item text and comparing the data extracted to item data obtained from an independent verification source to confirm the accuracy of the item data provided by the third party.

In a sixth aspect, a method of submitting item data associated with items for listing on a retail website by the third party described. The method includes mating at an application programming interface of a retailer item management system item data including at least one of an item image or item text associated with one or more items fulfilled by the third party for inclusion on a retailer website. In item validation report is received which is based on an output of the field verification stage. The item validation report includes whether data extracted from at least one of the image of the item or text associated with the item matches item data obtained from an independent verification source. If the item validation report includes at least one error the one or more items are not listed for sale at the retailer website. If the item validation report does not include any errors, the one or more items are automatically listed at the retailer website.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

As briefly described above, embodiments of the present invention are directed to management of third party sellers of items hosted on a retailer website, and a control interface to ensure item data provided by the third party seller are accurate and validated. In example aspects, an automatic item approval process determines, based on an identity of the seller, items, item types, and/or item brands that the seller is authorized to sell via the retailer website. In other example aspects, an automatic item approval process determines, based on data extracted from an item image or item text, whether item data provided by the third party is accurate.

For example, a retailer may provide an API at which sellers may submit items for inclusion on the retailer website. The retailer may have preauthorized the seller to sell items of a particular type, of a particular brand, or even particular items. An automated item ingestion pipeline processes the items to determine suitability for inclusion on the retailer website. In example implementations, the automated item ingestion pipeline includes a legalization pipeline stage that assesses the item and seller against a set of rules associated with that seller or item. For example, the seller may not be allowed to sell a particular brand or may be authorized to only sell a particular brand based on a whitelist/blacklist. Similarly, a seller may be allowed/disallowed from sales of specific items or item types. In other examples, a global set of rules may also be applied to all sellers by the legalization pipeline stage, for example to prevent all sellers from selling items that are already offered by the retailer via the retailer website. Such detailed, configurable exclusionary rules may be applied against a retailer's frequently-changing item collection and third party item collections and rules to provide exclusivity to the retailer, to brand companies wishing to sell products through the retailer website, or to other third party sellers, thereby improving the customer shopping experience. Concurrently, the methodology described herein provides streamlining of approvals for new items from third parties, often resulting in items being automatically eligible for inclusion on the retailer website without requiring prior user approval.

In other example implementations, an automated item verification pipeline includes an item verification stage that determines whether the item information provided by the third party is accurate. For example, the third party seller may not be allowed to sell an item if data extracted from the item image provided does not match the actual item image provided. Conversely, if the extracted item data from the item data provided by the third party matches, the item may be automatically eligible for inclusion on the retailer website without requiring prior user approval.

Figure 1:
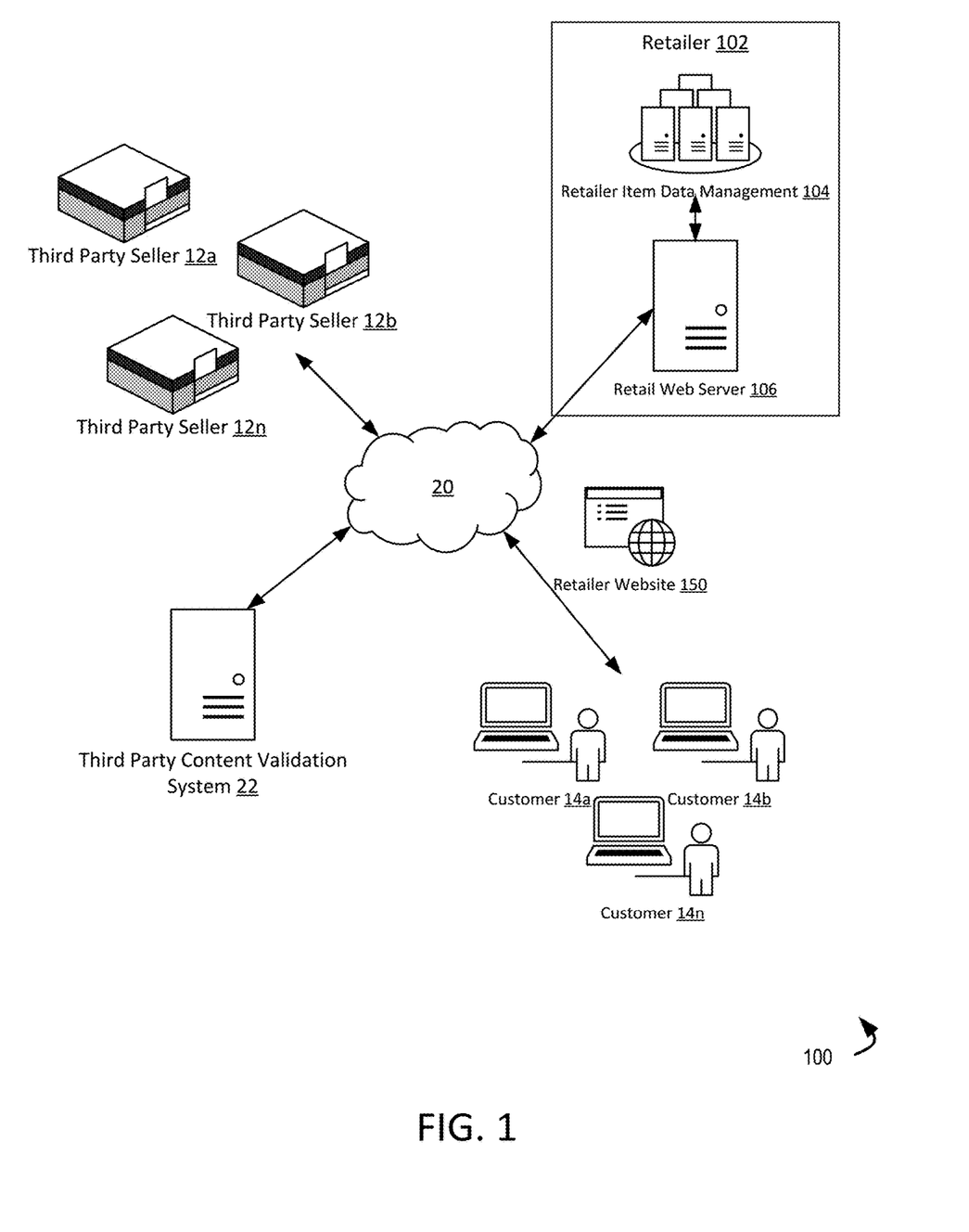
FIG. 1 illustrates an example environment in which an online retailer may host item sales by third party sellers through the online retailer's website.

Referring first to FIG. 1, an example environment 100 is shown in which an online retailer may host item sales by third party sellers through the online retailer's website. In the example shown, a retailer 102 includes a retailer item data management system 104 and a retail web server 106. The retailer 102 is generally an online retailer, but may also have one or more physical retail stores. The retailer item data management system 104 manages item data for the retailer, including item data for items that are presented to customers 14a-n via a retailer website 150 hosted by the retail web server 106 via network 20 (e.g., the Internet). In the embodiment shown, a plurality of third party sellers 12a-n may communicatively connect to the retailer item data management system 104, for example to provide item data for items those third party sellers wish to sell via the retailer website 150.

In the example shown, the retailer 102 may still further access a third party content validation system 22. The third party content validation system 22 may correspond to a publicly-available system capable of performing, for example, object recognition based on image data provided. In some example embodiments, the third party content validation system is configured to receive image data (and optionally metadata that at least partially describes the image) and returns enrichment data describing the contents of the image. This enrichment data can include identifying information about one or more objects in the image, such as item type, color, brand, source, or other identifying information. Additionally, the enrichment data can include assessment information regarding a potential likelihood that the image contains known copyrighted material, text or graphics that may be considered offensive or explicit, images of celebrity faces that may require attribution rights, or other known issues. For example, the enrichment data may provide a score of a likelihood regarding one or more such issues. In some embodiments, the third party content validation system 22 may be implemented using the Vision AI service provided by Google, Inc. of Mountain View, Calif.

Figure 2:
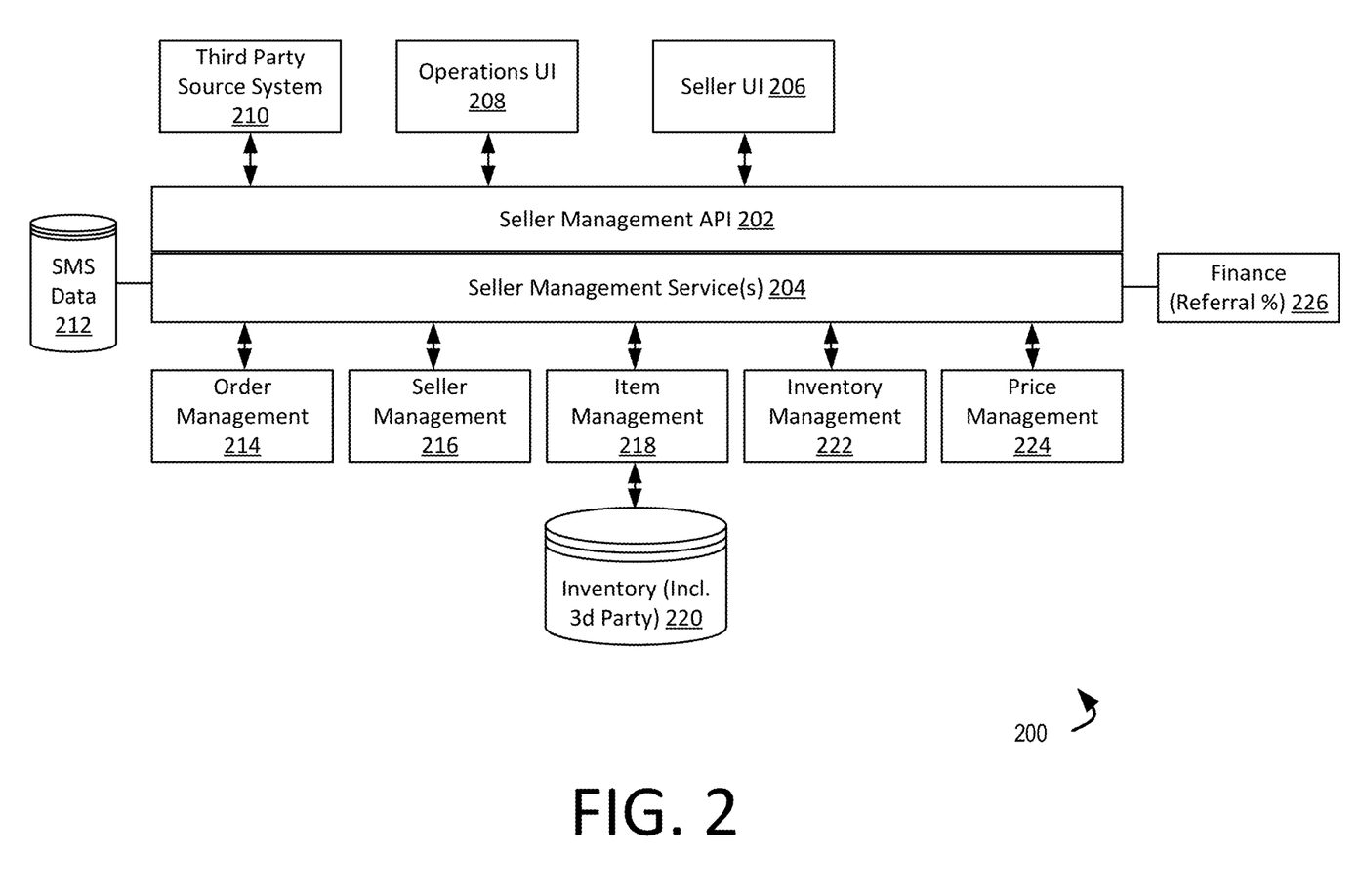
FIG. 2 illustrates an example architecture with which an online retailer may manage third party sellers.

FIG. 2 illustrates an example architecture 200 with which an online retailer may manage third party sellers. The example architecture 200 may be implemented, for example, at a retailer item data management system 104. In the example shown, the architecture 200 includes a seller management application programming interface (API) 202 and a seller management services layer 204. One or more third party sellers (e.g., sellers 12a-n of FIG. 1) may access the seller management API 202, for example using a seller user interface 206. Via the seller management API 202, sellers may be able to view and manage the items offered via the retailer website 150, including providing item data for items sellers wish to offer via the retailer web site.

In example embodiments, the item data can be received in a standardized but flexible data format, e.g., JSON. The item data can include, for example, an item identifier, and external item identifier, a relationship type between the seller and retailer, a seller identifier, and a number of items offered and location from which the items will be fulfilled (e.g., to determine shipping locations and shipping times). Additional information for each item may include item name, item description, item type, item department, item brand, images showing the item, UPC codes, or other identifying information.

In addition, an operations user interface 208 allows the retailer to manage contract terms with sellers, including management of items sold by those sellers, commissions on items, or definitions of items, item types, or brands that specific sellers are allowed to sell. In some embodiments, the operations user interface 208 further allows a retailer to view and approve or reject items that a third party seller wishes to sell via the retailer website 150. In some embodiments, and as discussed below, certain items may be automatically approved, while other items are automatically rejected, and a still further subset of items are flagged to require manual review, which may be performed via the operations user interface 208.

Additionally, a third party source system interface 210 allows retailer users to view and manage specific issues with respect to supply chain issues associated with third party seller's offered products. For example, retailer users may view and approve listings of products by third parties that may otherwise not reach a threshold of a confidence level that could be automatically approved via the retailer item data management system. This can include, for example, approval of particular images, validation of product details, or otherwise providing approvals to third parties.

The seller management service 204 performs a number of functions based on requests received from the seller management API 202, as well as from a plurality of retailer services, and stores third party seller data in a seller management service database 212. In example embodiments, the seller management service 204 may be called by an external service, such as an item management service or some portion thereof, to provide information regarding items that may or may not be allowed to be sold by the seller.

The seller management service database 212 may include, for example, data describing a contract between the retailer and each seller, including price guidelines for items sold by that seller, a commission agreed upon by the seller and retailer, item types items, and brands that either are allowed to be sold by the seller or are disallowed from being sold by the seller (e.g., via a whitelist or blacklist), and inventory or order management details, such as capacity, location, shipping times, or other details. The retailer services include an order management service 214, a seller management service 216, and item management service 218, and inventory management service 222, and a price management service 224.

In the embodiment shown, the order management service 214 connects the seller management service 204 two and order management system which manages sales and returns of items. The order management service 214 allows orders which are received via the retailer website 150 to be managed and communicated to the seller, while also being able to manage returns through the retailer, including at retailer physical locations to the extent available.

Figure 3:
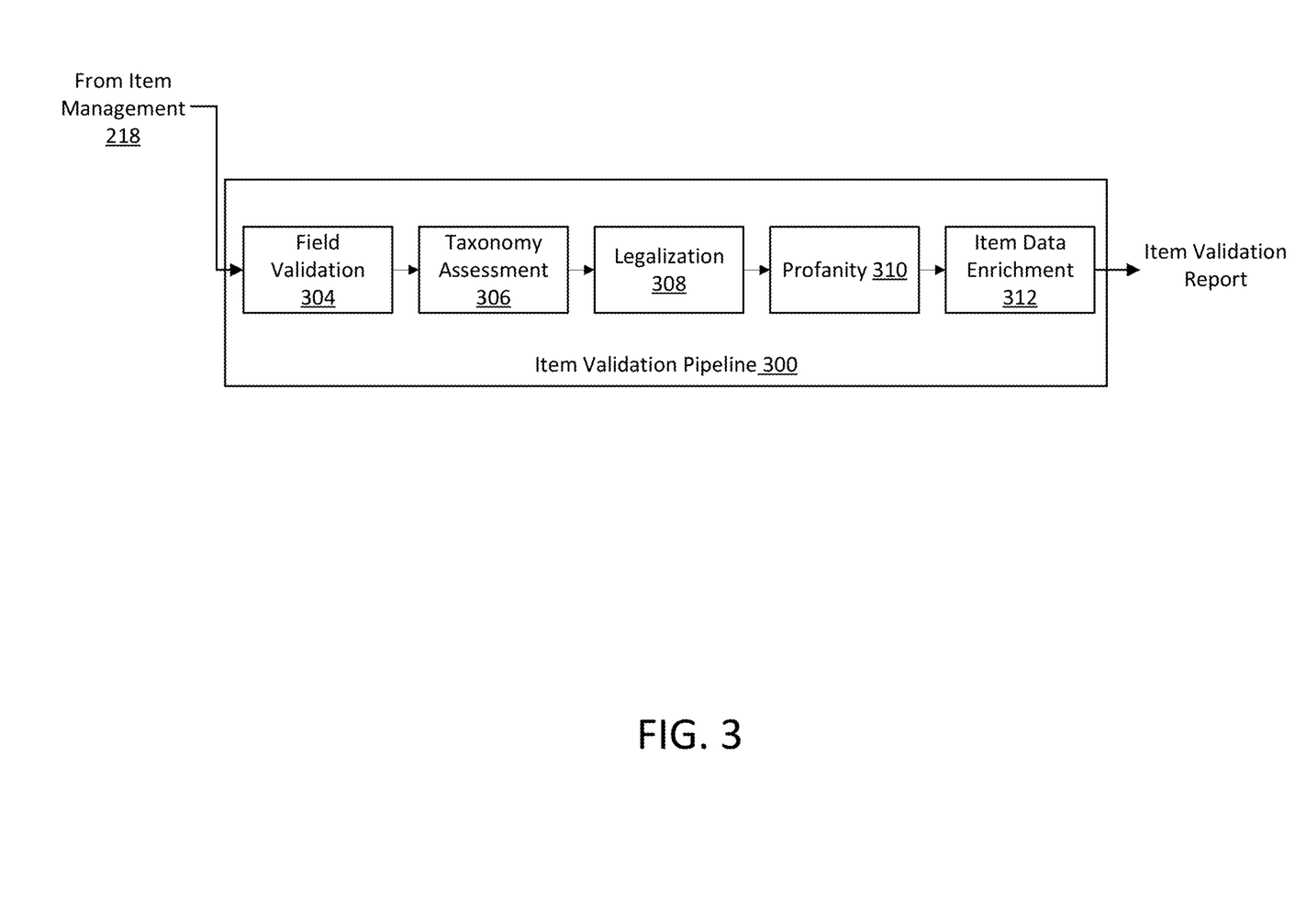
FIG. 3 is an example item validation pipeline useable within the third party seller management platform of FIGS. 1 and 2.

The seller management service 216 allows the retailer to control whether seller items appear in the retailer web site and to generally manage the agreement between the seller and the retailer. The seller management service 216 also can call a legalization stage 308 of an item validation pipeline 300, to determine whether the item for sale meets applicable guidelines, as described in more detail below.

The item management service 218 provides an interface to the retailer item inventories, and provides validation services for items submitted by third party sellers, so that such items that third party sellers wish to sell on the retailer website 150 can be in some cases automatically validated. In some embodiments, the item management service 218 calls an item validation pipeline, such as the pipeline 300 seen FIG. 3. Based on elevation of items by the item validation pipeline, the item management service 218 may include those items in an item collection, such as item collection 220.

In addition to the above, the inventory management service 222 provides an interface to the retailers' inventory management system, thereby allowing the retailer to view both retailer inventories and third party seller inventory, for purposes of displaying such inventory levels to customers visiting the retailer website 150. The price management service 224 receives price information for validated items, and stores price information for display with items on the retailer website 150. The finance service 226 calculates sales information associated with third party item sales, including a referral percentage provided to the retailer based on a sale of a third party item via the retailer website 150.

FIG. 3 is an example item validation pipeline 300 useable within the third party seller management architecture of FIG. 2. The item validation pipeline 300 may be included in or managed by the seller management service 216 and the item management service 218, or may be called from the seller management service 216 and the item management service 218. In such instances, the item validation pipeline may call the seller management service 204 to access information regarding permissions of the seller in the seller management service database 212.

In the embodiment shown, the item validation pipeline 300 performs a plurality of item validation process is which may either reject a third party seller of item, approve the third party seller item, or forward the item data for a third party seller item to be reviewed by a representative of the retailer. In the embodiment shown, the item management service 218 provides item data to the item validation pipeline 300. The item data includes all item data received from the third party seller, for example an item title, price, description, and one or more images of the item useable in an item listing on the retailer website. Additionally, some other information may be requested of the seller for purposes of finding an appropriate location within the retailer website 150 to display the item. For example, the item data may include, for example, category information, subcategory information, UPC information, or other identification information for the item.

Although item identification and categorization information may be entered by the seller, the retailer may wish to validate the information included, which may mis-categorize the item due to mistake or differences between different item taxonomies between the seller and retailer. Accordingly, in the item validation pipeline 300, a field validation stage 304 analyzes each of the fields included in the item data, and validates that appropriate data is present, and that no critical data is lacking. For example, if a seller fails to provide UPC data, item category information, or other types of item information, an error may be generated by the field validation stage, for inclusion on the item validation report. Errors generated by the field validation stage may include, for example, an indication of an invalid barcode, one or more missing fields, an invalid item type, a missing department or class, a missing or corrupt image, a low-quality image, an invalid field length or duplicate bar code, or other missing information (e.g., missing size, color, brand, product title etc.).

The field validation stage 304 also analyzes the information provided by the seller to ensure that the data provided is accurate. For example, when a seller provides text and/or an image of the item, the data is extracted and is used to verify the accuracy of the item data provided. To confirm the image accuracy, the field validation stage 304 receives at least one of an image source, related images, image creator, related text content, image popularity, manipulated image versions, and derivative works, for example, from a third party reverse image search query. To confirm the text accuracy, the field validation stage 304 receives at least one of a title, a description, a description of use, or other related text, for example, from a third party data service.

Furthermore, a taxonomy assessment stage 306 determines whether, based on the item title and description, and optionally item images, whether the seller-identified item information is appropriate. This can include, for example, assessment of whether the item is classified in an appropriate item category within the retailer's taxonomy (so the item can be most easily be found on the retailer website).

A taxonomy assessment stage 306 determines, based on validated item information, how a particular item may fit within a retailer taxonomy. It is noted that this assessment may be based not only on the third party seller's identification of an item category or department, but also based on item description, item name, or other information that may be validated for similarity to other retailer items, for purposes of categorizing the item in the retailer's taxonomy. This is advantageous because, in some instances, a third party seller may not be aware of the retailer taxonomy, or may wish to associate an item with a particular retailer taxonomy that is not appropriate. Because the retailer is more familiar with its core item collection, the retailer may more appropriately categorize the item in its taxonomy (e.g. in a correct department, location on a website, etc.). To the extent the third party seller has included item category information that is determined to be inappropriate or inaccurate, the taxonomy assessment stage 306 may generate one or more conditions that may be included in an item validation report generated by the pipeline 300, discussed below.

A legalization stage 308 assesses the one or more items defined in the item data relative to legalization rules that may be in place for the retailer in general, and/or for the third party seller specifically. For example, the legalization stage 308 may call the seller management services 204 which can, based on an agreement with the third party as define in the seller management services database 212, determine if the seller is allowed to sell an item of a particular identity, item type, or brand.

In example implementations, the legalization stage 308 determines whether the item identified in the item data from the seller also describes a same item that is already offered for sale by the retailer. For example, the seller management services 204 may determine an identity of an item (e.g., by UPC, item description, or other means) and compare that item identity to identities of items in a core item collection of the retailer. In further examples, the legalization stage 308 can determine that an item identified in item data is of a brand that the third party seller is not allowed to offer via the retailer website, for example because a brand owner has an agreement with the retailer to be an exclusive provider of the branded items on the retailer website.

In the embodiment shown, a profanity stage 310 is configured to detect the presence of offensive content within the item data. The profanity stage 310 analyses the item data, for example item descriptions, item titles, or images, to detect offensive content. The offensive content may include profanity, culturally insensitive content, violence, racy content, adult content, etc. In some examples, the profanity stage 310 may call an external image analysis API offered by one or more third parties to provide image analysis for automatically identifying a likelihood that images included in the item data may contain such potentially offensive content.

An item data enrichment stage 312 is configured to add additional item description data to the item data received from the third party seller regarding the items described in the received item data. For example, the item data enrichment stage 312 may be configured to add additional images for display on the retailer web site in association with the item, item reviews, additional item description information (dimensions, weight, etc.). Additional item description data may initially be gathered at the field validation stage 304 when the accuracy of the provided item data is confirmed.

Upon completion of execution of the item validation pipeline 300 with respect to item data, an item validation report may be generated. The item validation report can include, for example, one or more errors generated by pipeline stages, one or more conditions that may be addressed by the third party, or other item analysis information. The errors may include, for example, issues identified which may prevent the item from being displayed on the retailer web site. Example errors may include a lack of item data detected in the field validation stage 304, or an error determined in the legalization stage 308. In particular, a finding that the item is a duplicate item to an item offered by the retailer in the retailer's core item collection will generate an error and prevent the third parties item from being presented on the retailer website. Example conditions may include a discrepancy between the third party identified item type or department and an item type or department determined in the taxonomy assessment stage 306. An additional example condition may include a detection of profanity in the profanity stage 310; in such an instance the condition may not result in automatic rejection of the item, but may instead result in a determination that the item requires manual review prior to inclusion on the retailer website. In some instances, the items application report may include no errors or conditions, in which case the item may be acceptable for automatic inclusion on the retailer website.

In accordance with FIG. 3, it is noted that although a certain set of pipelines stages are described herein, there may be additional pipeline stages is used for item validation as well. Such additional pipeline stages may similarly be configured to generate error or conditions for inclusion on an item validation report.

Figure 4:
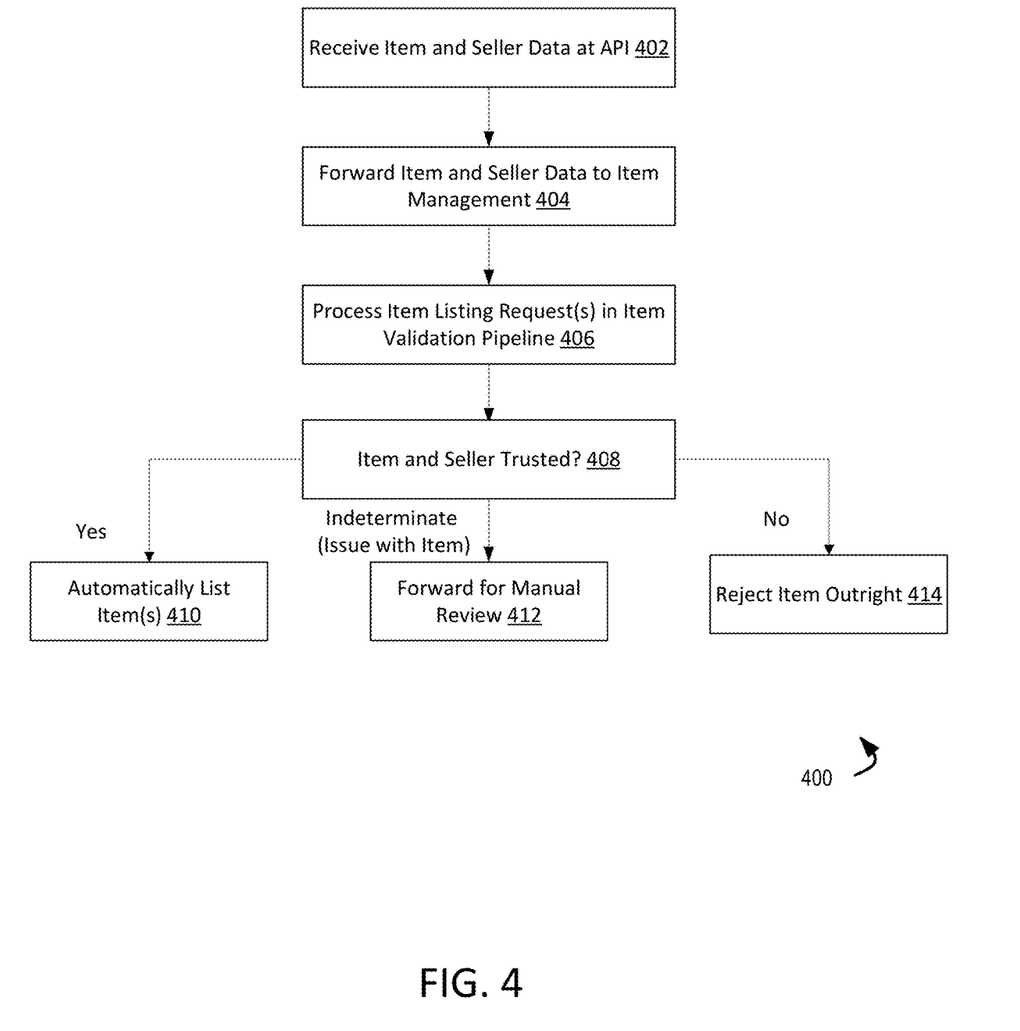
FIG. 4 illustrates a flowchart of a method for verifying item and seller information provided by a third party seller

However, if one or more conditions are present, the item may be forwarded to a retailer user for manual review (step 412). If one or more errors are present, the item may be rejected outright, and a message returned to the seller that the item will not be included on the retailer website (step 414).

FIG. 4 illustrates a flowchart of a method 400 for validating items described in third party item data, according to an example implementation. The method can be performed, for example, using the item validation pipeline discussed above in connection with FIG. 3, and generally within the architecture described above in connection with FIGS. 1-3. In the example shown, the method 400 includes receiving item and seller data at an API (step 402). This can include, for example, receiving item and seller data at a seller user interface which is configured to access the API. The seller data may be derived from seller credentials received at the seller user interface, and the item data may be uploaded by the seller via that user interface.

In the embodiment shown, the item and seller data is forwarded to an item management service (step 404). The item management service may then provide that item and seller data to an item validation service, which may either host or call an item validation pipeline (step 406). The process of step 406 is further described at FIG. 5. The item validation pipeline will generate an item validation report, which may be returned to the item validation service or item management service. The service receiving the item validation report may then analyze the report to determine whether the seller is allowed to offer the item via the retailer website (step 408). This may be performed, for example, based on errors or conditions included in the item validation report.

In the example shown, if the item and seller are trusted (there are no errors or certain conditions in the report), the item may automatically be listed on the retailer website (step 410). However, if one or more conditions are present, the item may be forwarded to a retailer user for manual review (step 412). If one or more errors are present, the item may be rejected outright, and a message returned to the seller that the item will not be included on the retailer website (step 414).

Accordingly, in use, a seller may initially submit item data describing a collection of items via the API. The seller may then receive, in response to that submission, a report indicating that one or more of the items described in the item data are associated with errors, such as indicating that those items are already offered by the retailer. In such a case, the seller may resubmit different item data excluding those items. The seller may receive a report indicating certain conditions with respect to the revised set of items for listing on the retailer website. The seller may elect to again resubmit revised item data to address the reported conditions. Alternatively, if there are no issues requiring seller attention identified in the conditions, or if no conditions are included in the report, the items corresponding to the revised item data may automatically be listed on the retailer website.

Figure 5:
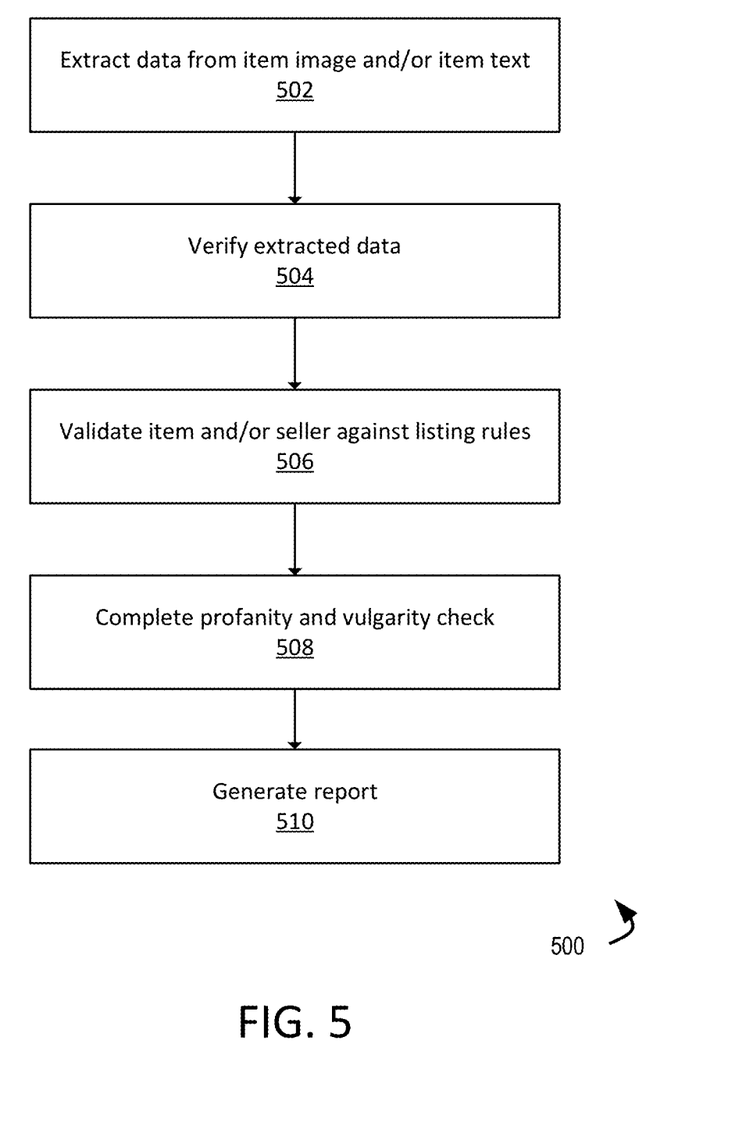
FIG. 5 illustrates a flowchart of a method of processing listing requests in the item validation pipeline.

FIG. 5 illustrates an example flowchart of a method 500 for processing item listing requests in the item validation pipeline 306. The method 500 can be performed, for example, using the item validation pipeline 306 discussed above in connection with FIG. 3, and with the third party listing management system 402 described at FIG. 4. The method 500 is useful to determine whether the item information provided by the third party seller is correct, or if there are errors associated with the provided item information. The method 500 further determines whether the items requested to be listed conforms to a set of listing rules and that the listing does not include profanity.

The item information, including at least item title, price, description, and one or more images of the item useable in an item listing on the retailer website are received from the third party seller.

After the item data has been received, the data associated with the item is extracted for verification (step 502). Data may be extracted from the text provided and/or the image provided by the third party. Data may be extracted by a text validation tool and/or an image validation tool accessed from the computing device 104 via the network 110. A text assessment tool can compare text information provided by the third party seller with text information elsewhere to confirm or deny whether the text information provided by the third party seller is accurate. A text assessment tool can also retrieve additional item information. For example if the third party seller provides text information corresponding to an item title, the text assessment tool may retrieve additional information such as item details.

In the example shown, the extracted data is used to verify that the information provided by the third party is correct (step 504). For text, data is extracted from the text provided and a text verification process is configured to determine whether the text provided is correct. A text validation tool can be used to receive information associated with the item text provided, including item title, item price, and/or item description. A text assessment tool may be third party tool. A text assessment tool can compare text information provided by the third party seller with text information elsewhere to confirm whether the text information provided by the third party seller is accurate.

A text assessment tool can also retrieve additional item information. For example if a third party seller provides text information corresponding to an item title, a text assessment tool may retrieve additional information such as item details, item availability, brand information, and other similar information. An additional item information tool can determine which information shall be further included in the item listing.

For images, data is extracted from the item image, and an item verification process is configured to receive at least one of an image source, related images, image creator, related text content, image popularity, manipulated image versions, and derivative works. The image information retrieved is used to verify that the item image provided corresponds to the item purported to be sold.

An image assessment tool can be used to verify that the item image provided corresponds to the item purported to be sold. An image assessment tool may be a third party tool, such as the Vision AI service provided by Google, Inc. of Mountain View, Calif. An image assessment tool can compare the image provided by the third party seller with other images and/or text to verify that the image provided is the correct image.

Still further, the item image can be used to determine that an item identified in item data is of a brand that the third party seller is not allowed to offer via the retailer website, for example because a brand owner has an agreement with the retailer to be an exclusive provider of the branded items on the retailer website.

In another example, if data is extracted from text associated with the image, the item verification process is configured to receive associated additional text and/or confirmation of the text provided, including, at least one of a title, a description, a description of use, or other related text. The text received can be compared to text information elsewhere to confirm or deny whether the text information provided by the third party seller is accurate.

In the example shown, the item and/or seller is validated against listing rules (step 506). An item legalization tool receives information about the item and/or seller, and, based on a set of rules stored at a rules database, determines whether the third party seller is allowed to sell the item on the retailer website. An item legalization tool can determine that an item identified in item data is of a brand that the third party seller is not allowed to offer via the retailer website, for example because a brand owner has an agreement with the retailer to be an exclusive provider of the branded items on the retailer website.

Additionally, in some embodiments, a profanity check is performed (step 508). A profanity check tool detects the presence of offensive content within the item data and/or image data. The offensive content may include profanity, culturally insensitive content, violence, racy content, adult content, etc. For example, if profanity is detected, the item as presented by the third party would not be listing for sale on the retailer website.

In some embodiments, a validation report is generated (step 510). The item validation report is based on an output of the item verification pipeline, and is provided by the item verification process. The validation report can be used to determine if the item is trusted, as shown in step 408 for FIG. 4. If the data extracted by item verification pipeline does not match the data associated with one or more items provided by the third party, an error message is provided to the third party. If the data extracted by item verification pipeline matches the data associated with one or more items provided by the third party, a validation message is provided to the third party.

In an example, the validation report is provided to both the third party seller and the retailer. In another example, the validation report is provided to the third party seller and the retailer only if the data extracted by item verification pipeline does not match the data associated with one or more items provided by the third party and an error is generated.

The third party submission is rejected if the data extracted by item verification pipeline does not match the data associated with one or more items provided by the third party. In an example, the third party may be able to correct any errors, and the method 500 proceeds back to step 502. In another embodiment, the third party seller must submit a new request.

The third party submission is accepted if the data extracted by item verification pipeline matches the data associated with one or more items provided by the third party. Upon acceptance, the one or more items are automatically listed at the retailer website.

Figure 6:
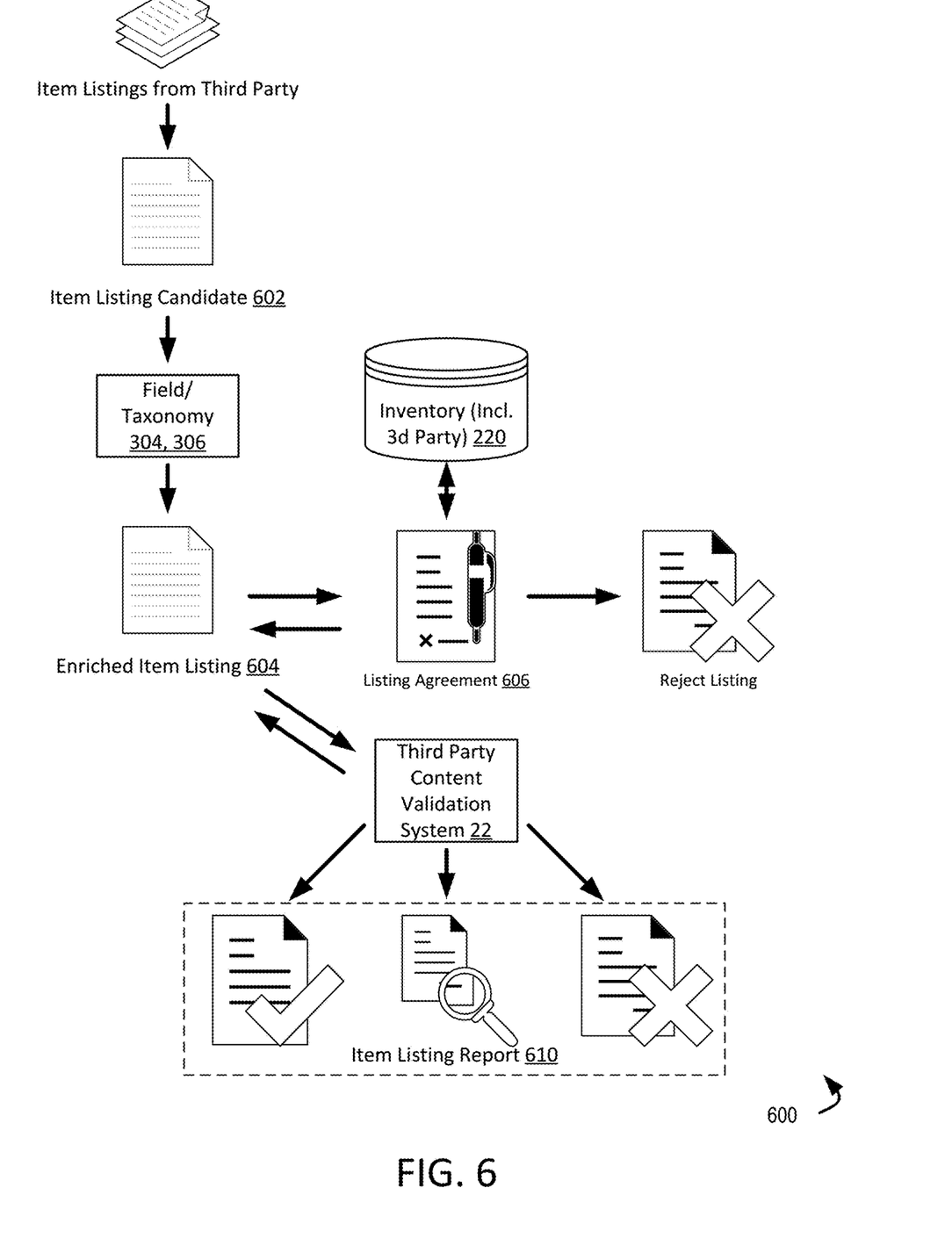
FIG. 6 is a detailed illustration of an example process flow to assess listing rules associated with an online retailer.

FIG. 6 is a detailed illustration of an example process flow 600 to assess listing rules associated with an online retailer. The process flow 600 can represent, for example, a particular use case in which the method 500 of FIG. 5 is performed using the systems described above.

In the example shown, a set of item listings may be received from a third party by a retailer. Each item listing 602 included in the one or more item listings can be considered, in this context, an item listing candidate which will be assessed relative to guidelines set by the retailer for listing items on that retailer's web site. Each item listing candidate will be provided, in the example shown, to a field or taxonomy assessment stage of an item validation pipeline, such as the pipeline 300 described previously. Accordingly, the item may be identified as falling within a particular category of items sold by the retailer, and a potential location within that retailer taxonomy can be identified. This may be performed, for example, based on an item description, since the item listing candidate may not include an accurate taxonomy (e.g., because the third party providing the item listing candidate is unaware of the retailer's taxonomy). At this stage, the item listing candidate it may be enriched by including metadata describing a particular location within the retailer taxonomy at which the item would be located.

The now-enhanced item listing 604 can next be assessed relative to one or more retailer legalization rules, which may be included in a listing agreement 606 that is specific to that third party entity. The legalization rules correspond to item listing permissions associated with the item and third party that are granted by the retailer. For example, if the item candidate is a pair of shoes from a particular brand, the legalization rules may be assessed, for example, to determine (1) whether that same brand and style of shoes are already offered by the retailer on the retailer web site (e.g., by verifying against an item listing database, such as inventory database 220), (2) whether the third party has a right to offer for sale the type of goods represented by the item (e.g., the retailer is authorized as a third party seller of luggage or baby goods, but not shoes), or (3) whether another third party has an exclusive right to sell goods of that type or brand (e.g., the brand owner may have exclusivity for resale of the shoe, preventing other third parties from acting as resellers of the same or similar items within the marketplace formed by the retailer website). Other types of rules (e.g., brand whitelists or blacklists, item type permissions, restrictions on minimum numbers of items listed, etc.) may be implemented as well.

If one or more legalization rules indicates that the item should not be listed on the retailer web site, in some embodiments, the item listing may be rejected outright. In other embodiments, the item listing will not be rejected all right, but instead a negative remark will be generated for inclusion on an item listing report associated with the item or the third party. Such information may be included, for example, in data associated with the item listing.

If the item candidate is not rejected outright based on the legalization rules, in the example embodiments in image analysis service may be called to provide further enrichment of the listing associated with the item candidate. Typically, each item can and it may include both a text description of the item as well as an image or more than one image of the item. In example embodiments at least the images, and in some cases the entire candidate item listing, can be provided to a remote, third party image analysis service (e.g., the previously-mentioned Vision AI service). In response, the item validation pipeline 300 may receive additional information from the third party image analysis service, as well as a confidence level regarding the item information that is generated. Based on that additional information and confidence level, the item validation pipeline may (1) further enhance the item listing with details received from the third party image analysis service, or (2) flag the item as requiring further review before being listed due to item detail mismatch or an identification of possibly objectionable content (e.g., profanity, other offensive content). Further details regarding such third party image analysis are provided below in conjunction with FIG. 7.

Upon completion of enhancement of the item listing, a report 610 is generated. Generally, the report will include an overall status of the item (e.g., approved, rejected, or requiring further review). The report 610 may also include a summary of additions or changes to an item listing applied by the pipeline 300. For example, the report 610 may include information regarding where the item will be listed in an overall retailer product taxonomy, open issues with respect to mismatch of item data between, e.g., submitted item data and item data obtained from image analysis.

In example embodiments, a single report is generated for a particular set of item listings submitted by one third party retailer. In alternative embodiments, separate reports may be generated for each item that is submitted.

Regarding items that are approved (as reflected in the report), in some example embodiments, the pipeline 300 allows for automatic listing of such items. This removes the requirement of review and approval of every item to be listed by a reviewing user associated with the retail website. However, for those items that require further review, the items may not be automatically listed until reviewed, (optionally) modified, and approved by a reviewing user associated with the retailer. For those items that are rejected outright, the third party listing entity may wish to review the report and resubmit corrected item listings. Accordingly, all or some subset of the report may be provided to the third party, at least in the event that one or more items is modified prior to listing or rejected outright.

Figure 7:
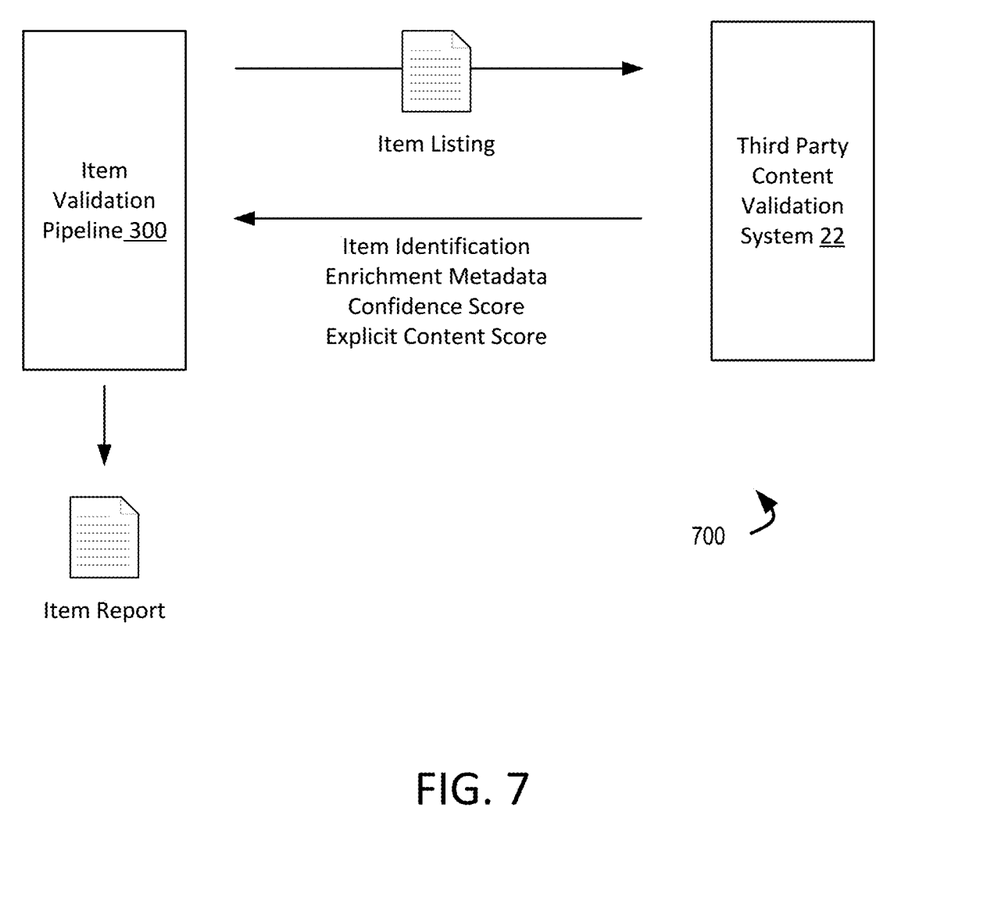
FIG. 7 is a detailed illustration of an example process flow to enrich item data used in a third party item listing, according to an example embodiment.

Referring now to FIG. 7, a detailed illustration of an example process flow 700 to enrich item data used in a third party item listing is shown, according to an example embodiment. In the example shown, the item validation pipeline may submit item listing information, including item images received from a third party, to a third party item validation service 22, such as an image analysis service. In response, the item validation service may return additional information describing the item (e.g., based on a detected object in image data), as well as a confidence level regarding the item information that is generated. As noted above, the item validation pipeline 300 may use that information to (1) further enhance the item listing with details received from the third party image analysis service, or (2) flag the item as requiring further review before being listed due to item detail mismatch or an identification of possibly objectionable content (e.g., profanity, other offensive content).

In specific examples, the additional information received from the third party item validation service 22 can include additional descriptive information identifying the item depicted in the image; in such an example, the additional descriptive information can be used to cross-reference against the item listing information provided by the third party seeking to list the item (e.g., to verify that the item image matches the descriptive information included in the submitted item listing). Mismatch between the descriptive information included in the submitted item listing and information received from the third party image analysis service may indicate that an incorrect image was submitted with the item listing, or that incorrect item descriptive information was included. For example, item information received from the image analysis service may indicate an item type different from that included in the original item listing; such a mismatch could be flagged to be resolved by a reviewing user associated with the retailer.

In further examples, the additional descriptive information can be used to further enhance the item listing information, e.g., to provide color information for clothing articles, to add brand or style information to an item listing, or to validate an item type against a preliminary placement of the item within a taxonomy based on the originally-submitted item information, and optionally update that placement within the taxonomy.

In still further examples, the additional information received from the third party item validation service 22 can include a notification that the item may include subject matter considered offensive or profane. In such cases, the item listing may be outright rejected or held for further review by a reviewing user associated with the retailer.

In some instances, such mismatch of information, or supplement of information, may be adopted only in response to that information being associated with a confidence level higher than a predetermined threshold that such information is correct. In such cases, if information is received from the third party image analysis service that mismatches item listing information received from the prospective third party seller but the confidence level of that information is low, either the information returned from the image analysis service may be disregarded altogether or may be otherwise discounted, such that it may not require review by a reviewing user associated with the retailer before listing, or may not be included in further enhancements of the item listing information.

Figure 8:
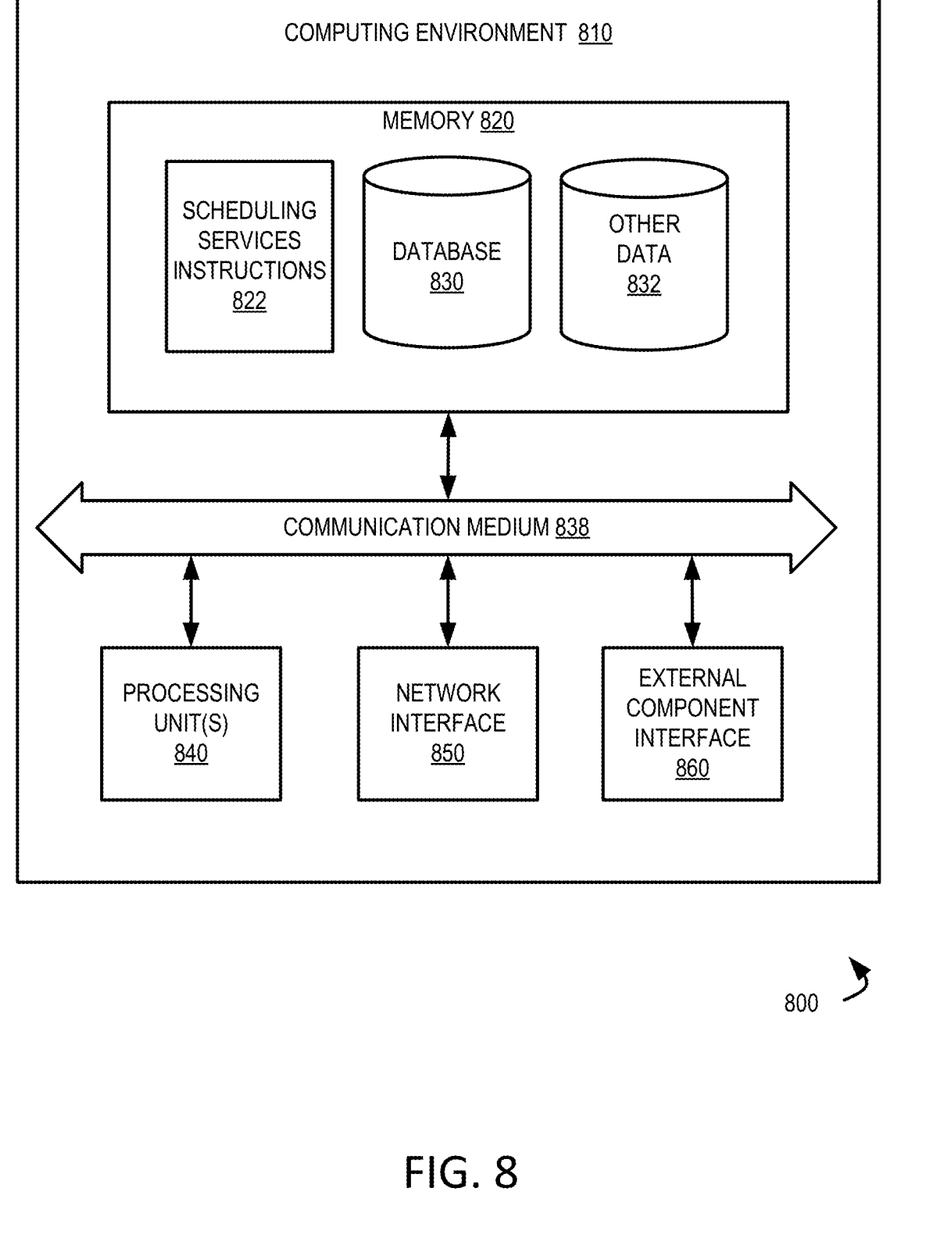
FIG. 8 is an example block diagram of a computing system useable with the disclosed systems and methods.

Referring now to FIG. 8, illustrates an example system 800 with which disclosed systems and methods can be used. In an example, the system 800 can include a computing environment 810. The computing environment 810 can be a physical computing environment, a virtualized computing environment, or a combination thereof. The computing environment 810 can include memory 820, a communication medium 838, one or more processing units 840, a network interface 850, and an external component interface 860.

The memory 820 can include a computer readable storage medium. The computer storage medium can be a device or article of manufacture that stores data and/or computer-executable instructions. The memory 820 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 820 can store various types of data and software. For example, as illustrated, the memory 820 includes scheduling services instructions 822 for implementing one or more aspects of the scheduling services described herein, database 830, as well as other data 832. In some examples the memory 820 can include instructions for generating a website and/or maintaining product information).

The communication medium 838 can facilitate communication among the components of the computing environment 810. In an example, the communication medium 838 can facilitate communication among the memory 820, the one or more processing units 840, the network interface 850, and the external component interface 860. The communications medium 838 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 840 can include physical or virtual units that selectively execute software instructions. In an example, the one or more processing units 840 can be physical products comprising one or more integrated circuits. The one or more processing units 840 can be implemented as one or more processing cores. In another example, one or more processing units 840 are implemented as one or more separate microprocessors. In yet another example embodiment, the one or more processing units 840 can include an application-specific integrated circuit (ASIC) that provides specific functionality. In yet another example, the one or more processing units 840 provide specific functionality by using an ASIC and by executing computer-executable instructions.

The network interface 850 enables the computing environment 810 to send and receive data from a communication network (e.g., network 20). The network interface 850 can be implemented as an Ethernet interface, a token-ring network interface, a fiber optic network interface, a wireless network interface (e.g., WI-FI), or another type of network interface.

The external component interface 860 enables the computing environment 810 to communicate with external devices. For example, the external component interface 860 can be a USB interface, Thunderbolt interface, a Lightning interface, a serial port interface, a parallel port interface, a PS/2 interface, and/or another type of interface that enables the computing environment 810 to communicate with external devices. In various embodiments, the external component interface 860 enables the computing environment 810 to communicate with various external components, such as external storage devices, input devices, speakers, modems, media player docks, other computing devices, scanners, digital cameras, and fingerprint readers.

Although illustrated as being components of a single computing environment 810, the components of the computing environment 810 can be spread across multiple computing environments 810. For example, one or more of instructions or data stored on the memory 820 may be stored partially or entirely in a separate computing environment 810 that is accessed over a network.

Referring to FIGS. 1-8 generally, it is recognized that the item listing processing described herein has a number of advantages relative to existing marketplace listing technologies. For example, the present systems avoid maintaining multiple record associated with the same item, which saves memory space and avoids the requirement of listing multiples of the same item from different sellers (which takes up website space and increases prospective customer confusion). Additionally, the present systems allow for flexibly allowing for exclusive listing privileges provide to certain third parties without requiring users of the retailer to manually review each item listing to enforce that exclusivity. Additionally, the present systems ensure high quality images are used on the retailer website, and also improve item listings with automatically obtained information about items that may have inadvertently been excluded from an originally-submitted item listing. Further, the present systems provide multiple checkpoints to ensure that items are placed in an appropriate location within a retailer's taxonomy. Other advantages exist as well, and are reflected in the claims as appended hereto.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A third party item listing management system useable for validation of third party items to be included on a retailer website, the third party item listing management system comprising:
    at least one processor; and
    at least one memory device storing instructions which, when executed by the at least one processor cause the third party item listing management system to perform the steps of:
        publishing, by the retailer website, an application programming interface (API) accessible by a plurality of third parties, the API being configured with a seller management service of the third party item listing management system;
        receiving, by the API, an identity of a third party and item data associated with one or more items;
        transmitting, by the API, the identity of a third party and the item data associated with the one or more items to an item management service;
        receiving, by the item management service, the identity of the third party and the item data associated with the one or more items;
        executing, by the item management service, a command to interface with the seller management service;
        determining, by the item management service, that the interface with the seller management service has been achieved;
        based on determining, by the item management service, that the interface with the seller management service has been achieved, receiving the identity of the third party and the item data associated with the one or more items;
        executing, by the item management service, a call to an item validation pipeline, the item validation pipeline including a plurality of item validation stages including an item legalization stage;
        wherein the item legalization stage is performed by the item management service by:
            validating, by the item management service at the item legalization stage in the item validation pipeline, the item data and the identity of the third party against a plurality of item listing rules to determine whether the one or more items are allowed to be offered via the retailer website by the third party;
        wherein one of the plurality of item listing rules is performed by the item management service by:
            detecting, by the item management service at the item legalization stage in the item validation pipeline, one or more duplicate items from the one or more items that are duplicates to a core item in a core item collection offered by the retailer website;
            generating, by the item management service at the item legalization stage in the item validation pipeline, an error identifying the one or more duplicate items;
            determining, by the item management service, that the item legalization stage in the item validation pipeline is complete;
            based on determining, by the item management service, that the item legalization stage in the item validation pipeline is complete, generating a seller user interface; and
            displaying, by the API, the error identifying the one or more duplicate items and preventing, by the seller management service, the third party from listing the one or more duplicate items on the retailer website.

2. The third party item listing management system of claim 1, wherein the plurality of item listing rules includes a rule preventing the third party from listing an item of a predetermined brand.

3. The third party item listing management system of claim 2, wherein the predetermined brand corresponds to a brand sold by a second third party on the retailer website.

4. The third party item listing management system of claim 1, wherein the plurality of item listing rules includes a rule preventing the third party from listing an item of a predetermined item type.

5. The third party item listing management system of claim 1, wherein the plurality of item validation stages includes an item data enrichment stage.

6. The third party item listing management system of claim 1, wherein the plurality of item validation stages includes a taxonomy assessment stage configured to determine, based on the item data, a location within a retailer taxonomy of the retailer website for the one or more items.

7. The third party item listing management system of claim 1, wherein the plurality of item validation stages includes a profanity assessment stage configured to detect the presence of offensive content within the item data.

8. The third party item listing management system of claim 1, wherein the plurality of item validation stages further includes a field validation stage configured to determine accuracy of the item data provided by the third party.

9. The third party item listing management system of claim 1, wherein the item management process is configured to generate an item validation report based on an output of the item validation pipeline.

10. The third party item listing management system of claim 9, wherein, upon determining that the item validation report includes at least one error, the item management process is configured to reject the one or more items from being listed on the retailer website.

11. The third party item listing management system of claim 10, wherein a determination that the one or more items includes a duplicate item to an item that is included in the core item collection offered by the retailer website results in generation of an error in the item validation report.

12. A method of automatically validating items sold by a third party for listing on a retailer website, the method comprising:
  publishing, at the retailer website of a retailer item management system, an application programming interface (AR) accessible by a plurality of third parties, the AR being configured with a seller management service;
  receiving, by the API, an identity of a third party and item data describing one or more items submitted by the third party for inclusion on the retailer website;
  transmitting, by the API, the identity of a third party and the item data associated with the one or more items to an item management service;
  receiving, by the item management service, the identity of the third party and the item data associated with the one or more items;
  executing, by the item management service, a command to interface with the seller management service;
  determining, by the item management service, that the interface with the seller management service has been achieved;
  based on determining, by the item management service, that the interface with the seller management service has been achieved, receiving the identity of the third party and the item data associated with the one or more items;
  executing, by the item management service, a call to an item validation pipeline, wherein the item validation pipeline includes a plurality of validation stages including an item legalization stage;
  wherein the item legalization stage is performed by the item management service by:
    validating by the item management service at the item legalization stage in the item validation pipeline, the item data and the identity of the third party against a plurality of item listing rules to determine whether the one or more items are allowed to be offered via the retailer website by the third party;
  wherein one of the plurality of item listing rules is performed by the item management service by:
    detecting, by the item management service at the item legalization stage in the item validation pipeline, one or more duplicate items from the one or more items that are duplicates to a core item in a core item collection offered by the retailer website;
    generating, by the item management service at the item legalization stage in the item validation pipeline, an error identifying the one or more duplicate items;
    determining, by the item management service, that the item legalization stage in the item validation pipeline is complete;
    based on determining, by the item management service, that the item legalization stage in the item validation pipeline is complete, generating a seller user interface; and
    displaying, by the API, the error identifying the one or more duplicate items and preventing, by the seller management service, the third party from listing the one or more duplicate items on the retailer website.

13. The method of claim 12, further comprising generating an item validation report.

14. The method of claim 13, wherein the item validation report includes one or more errors generated by the item validation pipeline, including the error identifying the one or more duplicate items.

15. The method of claim 14, further comprising automatically rejecting the one or more items submitted by the third party via the API based on the one or more errors.

16. The method of claim 15, wherein the one or more errors include at least one error indicating that the item is of an item type, item identity, or brand that are not permitted for sales by the third party based on the plurality of item listing rules.

17. The method of claim 12, wherein the plurality of item listing rules includes one or more whitelists or blacklists of items.

* * * * *